Inventor
Davis Brown
By Frease and Bishop
Attorneys

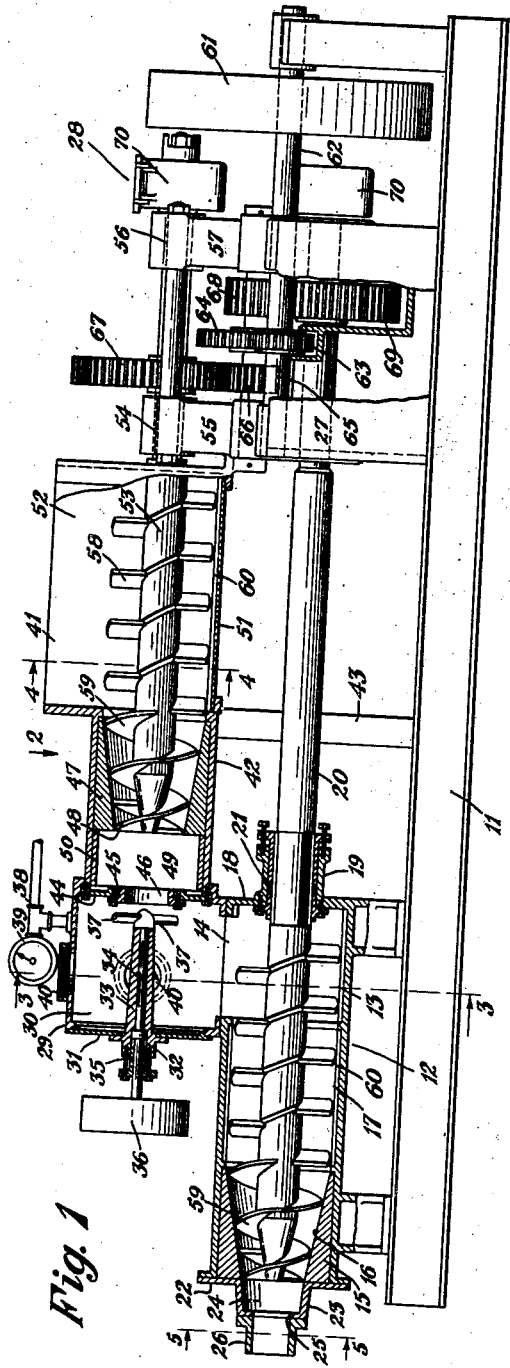
Jan. 8, 1935.    D. BROWN    1,987,359
APPARATUS FOR PLASTIC MATERIAL MANUFACTURE
Filed Dec. 21, 1932    6 Sheets-Sheet 1
Inventor
Davis Brown Jan. 8, 1935.　　　　　D. BROWN　　　　　1,987,359
APPARATUS FOR PLASTIC MATERIAL MANUFACTURE
Filed Dec. 21, 1932　　　6 Sheets-Sheet 2
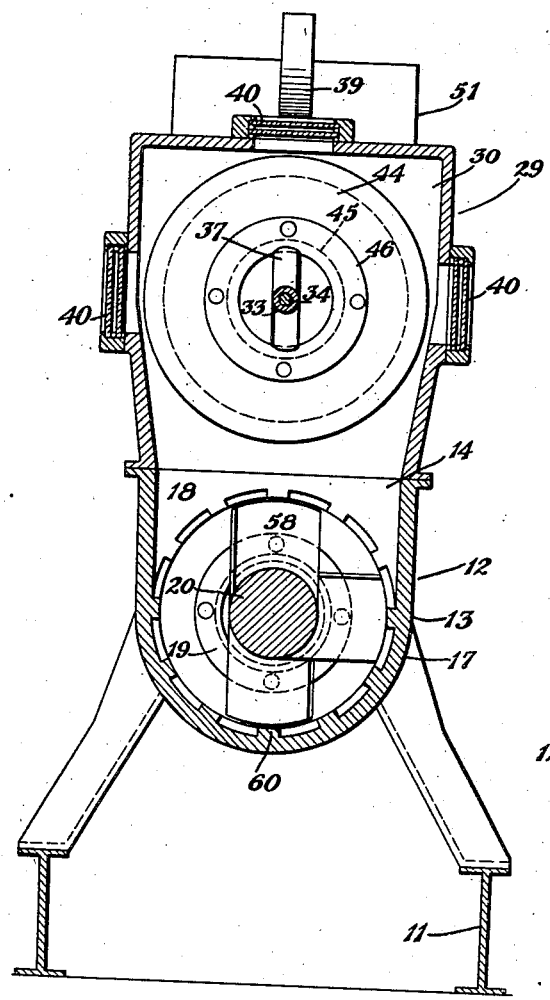
Fig. 3
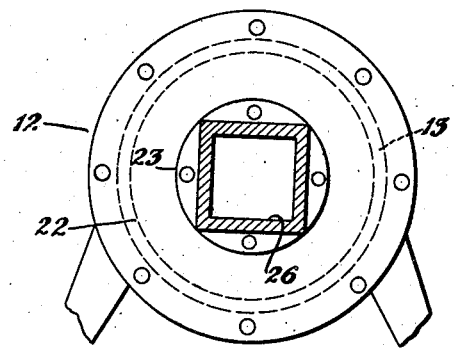
Fig. 4
Fig. 5
Inventor
*Davis Brown*
By *Frease and Bishop*
Attorneys Jan. 8, 1935.　　　　　D. BROWN　　　　1,987,359
APPARATUS FOR PLASTIC MATERIAL MANUFACTURE
Filed Dec. 21, 1932　　　6 Sheets-Sheet 3

Jan. 8, 1935.  D. BROWN  1,987,359
APPARATUS FOR PLASTIC MATERIAL MANUFACTURE
Filed Dec. 21, 1932   6 Sheets-Sheet 6
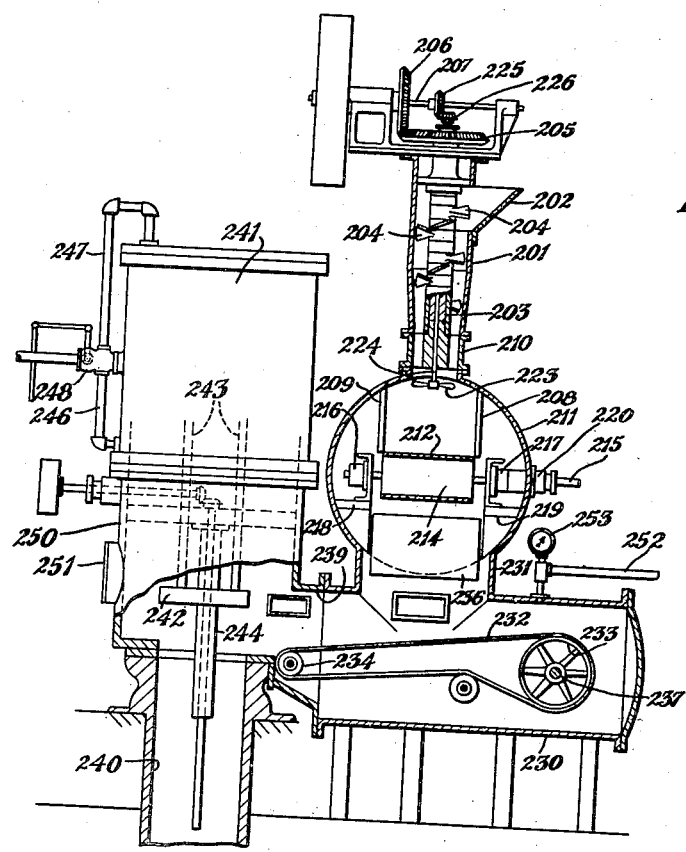
Fig. 11
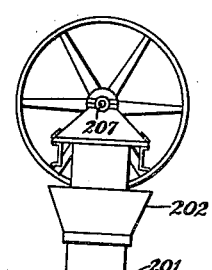
Fig. 12
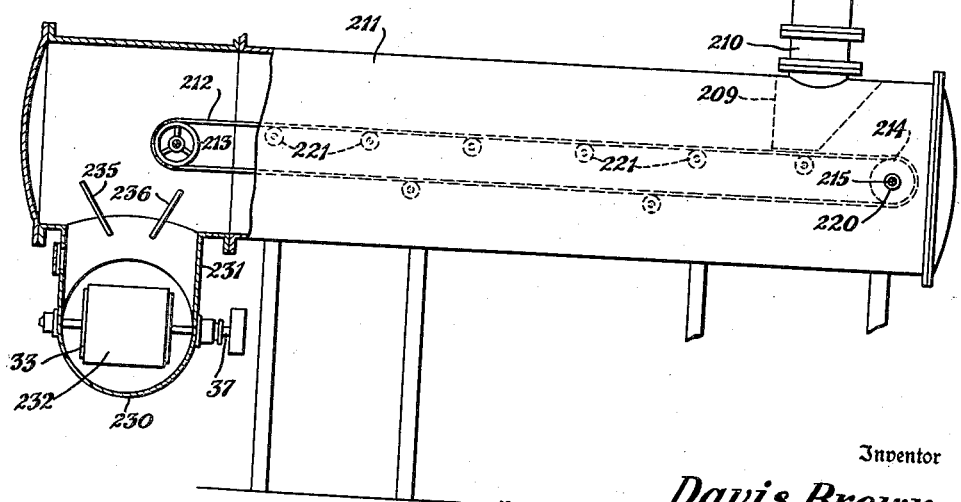
Inventor
*Davis Brown*
By Frease and Bishop
Attorneys Patented Jan. 8, 1935

1,987,359

UNITED STATES PATENT OFFICE 1,987,359

APPARATUS FOR PLASTIC MATERIAL MANUFACTURE

Davis Brown, Los Angeles, Calif.

Application December 21, 1932, Serial No. 648,255

13 Claims. (Cl. 25—11)

The invention relates to methods and apparatus for use in the manufacture of products of plastic materials, and more particularly for use in the manufacture of products of ceramic materials such as clays, shales, and mixtures of the same, and the manufacture of which includes forming by any desired means, units from a plastic mass of the material, drying the units, and then usually firing the units to make the finished burned ceramic products.

The invention also relates to methods and apparatus for use in the manufacture of units from plastic materials, such as certain clays, shales, and mixtures of the same, and such as Portland cements, and the manufacture of which includes forming by any desired means, units from a plastic mass of the material, and then drying and hardening the formed units directly in the air or atmosphere without requiring firing.

The present improvements include subject matter set forth in my applications for United States Letters Patent, Serial No. 587,195, entitled Methods and apparatus for molding clay bodies, filed January 18, 1932, and Serial No. 587,911, entitled Apparatus for molding clay bodies, filed January 21, 1932, of which the present application is a continuation in part.

Prior to the availability of the methods and apparatus of the present invention, products manufactured as aforesaid from plastic material of any particular composition, such as a particular clay, or a particular mixture of clays, have been subject to dimensional and form limitations, which confined the sizes and shapes of such products very materially.

Many different reasons have been advanced for the aforesaid dimensional and form limitations heretofore encountered in the manufacture of products or articles of manufacture from such materials as the ceramic or fire hardening materials, such as clays, shales, and mixtures including the same, or the air hardening materials, which include some clays, shales, and mixtures including the same, as well as Portland cements.

All of such plastic materials may be termed heterogeneous plastic materials, because each comprises a mixture of solids, liquids, and gases, and the gases may or may not be that mixture of gases ordinarily called air, and it has become generally accepted that the gas content of such materials is one of the most important causes of the aforesaid dimensional and form limitations.

Heretofore by aging or tempering treatments, there has been effected a limited reduction in the ratio between the mass of gas or gases, and the mass of liquids and solids in any unit mass of such a heterogeneous plastic material.

The term homogenizing may be said to indicate any treatment which effects a greater reduction in the ratio between the mass of gas or gases, and the mass of liquids and solids in any unit mass of such a heterogeneous plastic material, than is effected by the usual aging or tempering treatments.

Likewise, such a heterogeneous plastic material may be said to be homogenized when the ratio between the mass of gas or gases, and the mass of liquids and solids in any unit mass of the heterogeneous plastic material, is less than the ratio would be if the material had been subject to the usual aging or tempering treatments.

Such a heterogeneous plastic material may be said to be highly homogenized when the gas content of the same has been substantially eliminated by any suitable treatment.

In general, products made of homogenized plastic material are not subject to the aforesaid dimensional and form limitations. From a standpoint converse to that of dimensional and/or form limitations, the usual specifications as to the strength of any particular products may be met by the use of a lesser wall thickness for the product when the same is made of homogenized plastic material, than the wall thickness required when the product is made by the use of un-homogenized plastic material.

It has been discovered that the beneficial results of homogenizing plastic material are best attained the higher the degree of homogenization of the material.

The objects of the present invention include, therefore, the provision of improved methods and apparatus, so that by the use of the improved methods and apparatus heterogeneous plastic material may be homogenized to a high degree, whereby products may be made therefrom which are not subject to the aforesaid dimensional, form, and/or strength limitations of unhomogenized products.

The foregoing and other objects are attained by the methods, apparatus, parts, combinations, and sub-combinations, which comprise the present invention, and the nature of which is set forth in the following general statement, and preferred embodiments of which are set forth in the following description, and which are particularly and distinctly pointed out and set forth in the appended claims forming part hereof.

The nature of the improved method of the present invention may be stated in general terms as including isolating a mass of plastic material from the normal atmosphere, moving the isolated mass, compressing the isolated moving mass, rapidly disintegrating or comminuting the isolated moving mass into relatively small pieces or shreds, preferably simultaneously subjecting the comminuted pieces or shreds to an atmosphere isolated from the normal atmosphere and having a reduced pressure, preferably a vacuum of from 21 to 26 inches or higher of mercury, continuously moving or pumping said isolated atmosphere of reduced pressure away from the moving pieces or shreds to the normal atmosphere thereby reducing and pumping away the gas content of the pieces or shreds of plastic material, re-compressing the pieces or shreds of plastic material having a reduced gas content to form a highly homogenized mass of the plastic material, and then moving the highly homogenized mass of plastic material into the normal atmosphere.

The improved method hereof furthermore includes novel details as are hereinafter more fully set forth.

The nature of the improved apparatus of the present invention may be stated in general terms as including pressure sealed isolating walls forming a succession of communicating chambers, an inlet opening for the first chamber communicating with the normal atmosphere, and an outlet opening for the last chamber communicating with the normal atmosphere, the communicating chambers having operatively mounted therein and/or forming in the order named, a pug mill or feeder unit, a first compression unit preferably an extrusion screw press, a first plug seal forming chamber, a vacuum chamber and preferably relatively high speed disintegrating or shredding means independently operative therein, re-compression means, a second plug seal forming chamber, and said inlet opening communicating with the pug mill or feeder unit, and said outlet opening preferably in the form of an extrusion die communicating with said second plug seal forming chamber.

Means are provided, preferably a vacuum pump operatively connected with the vacuum chamber, whereby the isolated atmosphere of the vacuum chamber is maintained at a reduced pressure, preferably a vacuum of from 21 to 26 inches or higher of mercury, and whereby said isolated atmosphere is continuously moved or pumped away from the vacuum chamber into the normal atmosphere.

Several preferred embodiments of the improved machine or apparatus, are illustrated in the accompanying drawings forming part hereof, in which Fig. 1 is a vertical longitudinal section of one embodiment of the improved apparatus taken substantially on the line 1—1 of Fig. 2 in the direction of the arrows;

Fig. 2 is a plan taken in the direction of the arrow 2 of Fig. 1;

Fig. 3 is a transverse section on the line 3—3 of Fig. 1 in the direction of the arrows;

Fig. 4 is a transverse section on the line 4—4 of Fig. 1 in the direction of the arrows;

Fig. 5 is a transverse section on the line 5—5 of Fig. 1 in the direction of the arrows through the final extrusion die;

Fig. 11 is an enlarged elevation, partially in section, of a portion of the embodiment of the apparatus of Fig. 10; and Fig. 12 is an end view, partially in section, of the embodiment of the apparatus illustrated in Figs. 10 and 11.

Figure 6:
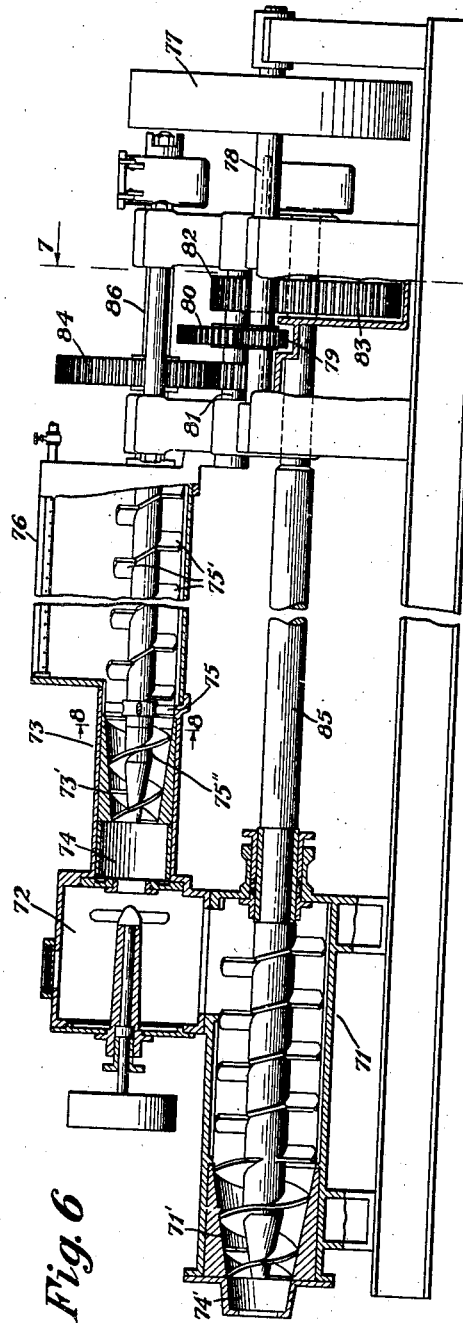
Fig. 6 is a longitudinal section of a second embodiment of the improved apparatus somewhat similar to Fig. 1 but showing the sealing press and the extrusion press of different capacities.

Dealing first with the construction of Figs. 1 and 2, I employ a base 11 which is of a substantial character and may rest on a floor or the like. On this there is mounted the extrusion press 12, this press having a casing 13 which is preferably cylindrical with an opening 14 at one end at the top. Filler blocks 15 form a tapered portion 16. The major length 17 of the press is cylindrical. The extrusion press has an end closure 18 at one end with a suitable journal 19 for the shaft 20. This journal has an air-tight packing 21 of a suitable character. The opposite or discharge end of the press has a closure head 22 with a box structure 23 formed integral therewith. This forms a sealing chamber 24. There is a contracted outlet 25 from the sealing chamber, and extrusion dies 26 are connected outside of this discharge opening. The shaft 20 is illustrated as a cantilever shaft having the bearing 19 and also the bearing 27 in the gear housing designated generally at 28.

Fitting on top of the extrusion press there is a box-like structure 29 to form the evacuation chamber 30. This has an opening connecting with the opening 14 of the extrusion press. It is provided with a demountable end 31 of substantially the full size of such end and in this end there is mounted a journal box 32 with a long inward extension 33. A shaft 34 extends through the bearings and has an air-tight packing 35. This shaft is independently driven by an external pulley 36 and has a comminuting blade, or preferably, as shown, a plurality of comminuting blades 37 mounted thereon on the inside. The pipes 38 communicating with a vacuum pump, not shown, provide for creating the vacuum in the evacuation chamber. A gauge 39 is provided to read the degree of vacuum and observation windows 40 are provided. The sealing press designated generally by the numeral 41 has a substantial body structure 42 formed cylindrical and supported on columns 43 at one end and connected to the evacuation chamber at the other end. This has a closure plate 44 which is bolted to the end of the sealing press and is smaller than the closure plate 31 of the evacuation chamber so that on removal of the plate 31 the end plate 44 may be removed. This end plate 44 has an opening 45 in which is fitted an extrusion die 46. A tapered block 47 is fitted in the discharge end of this press and has an opening 48 at one end and discharging into the packing space 49, there being a sleeve 50 fitting between the block 47 and the closure plate 44. If desired, the sealing press may have a central body 51 of lighter metal. This, however, is formed cylindrical with a hopper opening 52 at the top.

A cantilever shaft 53 has a journal 54 in the pedestal 55 and another journal 56 in another pedestal 57, these extending upwardly from the base 11.

The two shafts in this construction are preferably made of the same diameter and length. They have a series of blades 58 of a pug mill type and set, with a desired pitch to feed material longitudinally of the shaft. In the tapered portion of the presses there is a combined spiral and helical screw 59, this manifestly having a taper to conform to the taper of the blocks in both the sealing and extrusion presses. The usual helical ribs or lands 60 are provided in each of the presses. The blades have a working clearance on the sides of each press, and the screw threaded portion a working clearance at the tapered part of the press.

It will be noted by this construction that the packing chamber is larger in diameter than the discharge outlet of the sealing press, and the closure end plate 44 forms a resistance for the movement of the clay, causing this packing chamber to become filled with a mass of clay under pressure, which is extruded through the extruding die.

With this design I have constructed the shafts and blades of the two presses of the same size and diameter, the presses themselves being of the same size, but I drive the shafts at a different rate of speed. The shaft in the sealing press is driven at a lower speed than the shaft in the extrusion press so that material may be fed away for extrusion faster than it is possible to feed this by the sealing press to the comminuting chamber.

Another characteristic of my invention is that there are no obstructions in the packing chamber 49. The shaft 53 of the sealing press does not extend therein, and the shaft of the cutting or comminuting blade does not extend through this chamber or through the extrusion die 46; therefore, there are no working parts to form a space or break the vacuum seal. The comminuting blade or blades are independently operated at a high rate of speed and rapidly cut and break the material extruded through the extruding die 46. This material then, in a finely comminuted condition with a large area exposed, is subjected to the vacuum in the evacuation chamber. The blades on the extrusion press engage these small particles of clay, again work them and cut them, exposing different surfaces to the partial vacuum. At the same time the small particles are fed longitudinally of the extrusion press until they become acted upon by the screw, when they are tightly compressed in the sealing chamber 24 before being finally extruded.

The particular drive arrangement which I have illustrated employs a main drive pulley 61 on a shaft 62. This has a pinion 63 driving a gear 64 on a countershaft 65. This shaft has a pinion 66 which drives a gear 67 on the shaft 53. The countershaft also has a gear 68 which drives a gear 69 on the shaft 20. This gear system is designed, as above mentioned, to operate the shaft of the extrusion press at a higher speed than that of the upper sealing press. Thrust bearings are indicated at 70, these being of the usual type.

Figure 7:
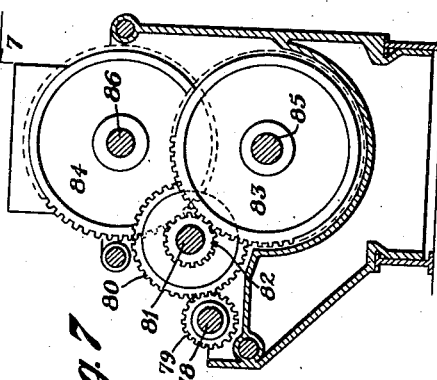
Fig. 7 is a transverse section on the line 7—7 of Fig. 6 in the direction of the arrows, illustrating the gear drive.
Figure 8:
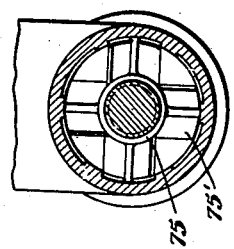
Fig. 8 is a transverse section on the line 8—8 of Fig. 6 in the direction of the arrows.

In the constructions of Figs. 6 and 7, the set-up is somewhat as in Figs. 1 and 2. I utilize an extrusion press 71 with a tapered end 71', an evacuated chamber 72, and a sealing press 73 with a tapered end portion 73'. There is a packing chamber 74 at the end of the sealing press and second sealing chamber 74' at the end of the extrusion press. Where it is desired to temper the material in the sealing press I usually elongate the shaft of such press and provide a bearing 75 between the pug mill blades 75' and the compression screw 75''. The pipe for tempering water is indicated at 76. In the arrangement of Figs. 6 and 7 the capacity of the sealing press is less than that of the extrusion press by forming it of a lesser diameter so that the shafts may be operated at the same rate of speed. In this arrangement of drive a main pulley 77 is illustrated as being mounted on a shaft 78, which shaft has a pinion 79 driving a gear 80 on a countershaft 81. This countershaft has two pinions of the same size, one of which is indicated at 82, and these drive gears 83 and 84 mounted on the shafts 85 and 86, respectively, of the extrusion and the sealing press.

An important feature of my invention from the standpoint of assembling and disassembling the construction are the demountable end plates 31 of the evacuation chamber and 44 of the packing chamber, and when the sleeve 50 is removed the tapering blocks 47 of the sealing press may be pulled outwardly through the evacuation chamber, and the shaft of the sealing press will likewise be pulled outwardly through this chamber. Where the shafts are of the same diameter this allows for ready interchangeability of the shafts of the sealing and extruding press.

Figure 9:
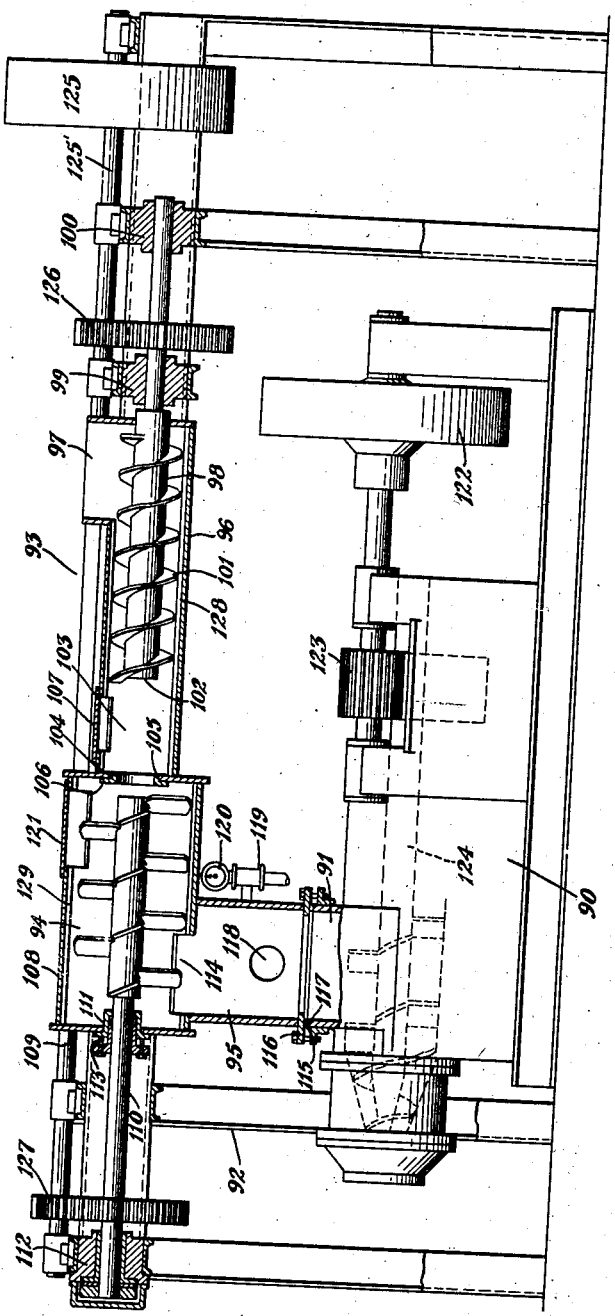
Fig. 9 is a vertical longitudinal section of a third embodiment of the improved apparatus showing a connection to a standard extrusion press.

In the alternative construction of Fig. 9 I illustrate a standard type of extrusion press designated generally at 90. This is indicated as a standard type of press having an intake hopper 91. I construct suitable supports 92 which extend above the extrusion press and on these I mount a sealing press 93, a comminuting or cutting machine 94, and a vacuum chamber 95 with its lower open end resting on the hopper 91 of the extrusion press. In this case the sealing press is indicated as having a cylindrical body 96 with a feed hopper 97 at one end. In this press there is a cantilever shaft 98 journaled outside of the press in the supports at 99 and 100. This press is indicated as having a helical screw thread 101. The shaft and the thread terminate at 102 and the end portion 103 forms a packing chamber, there being a closure end 104 with an opening 105 of less diameter than the press, and in this opening there is mounted a first extrusion die 106. A removable cover 107 is provided for the packing chamber.

The comminuting vessel 94 preferably has a cylindrical body 108 in axial alignment with the sealing press and this has a closure end 109 through which extends the shaft 110, this shaft being mounted in a journal 111 at the end 109 and in an external journal 112. Suitable packing 113 forms a seal on the shaft 110. The comminuting machine has an opening 114 leading to the evacuation chamber or vessel 95. A suitable seal is formed between this vessel and the hopper 91 of the press by having gaskets 115 compressible between the flange 116 of the evacuation chamber and the upper edge 117 of the hopper. In order to obtain this correct seal it may be necessary to have the supports 92 slightly adjustable or to raise the press 90 slightly with the chambers. The evacuation chamber is provided with windows 118. It has an exhaust pipe 119 connected to one side and a gauge 120. The comminuting machine is provided with a removable cover 121.

In this machine the standard press is driven by its own pulley indicated at 122. This, through the medium of gears 123, drives the shaft 124 with screw blades thereon. The sealing press and the comminuting press have their shafts driven with the main drive, this utilizing a main pulley 125 mounted on a longitudinally extending shaft 125', this being supported in suitable bearings. From this shaft there is a gear drive 126 to the shaft 98 of the sealing press and another gear drive 127 to the shaft 110 having the comminuting blades; these gears being arranged to drive the comminuting shaft at a higher rate of speed than the sealing press shaft.

In the operation of the machine of Fig. 9 the clay or other plastic material is fed in through the feed hopper 97 and is immediately acted upon by the screw 101 and pressed toward the packing chamber 103. It meets the resistance of the end wall 104 and forms a tight seal between the end of the shaft 102 and the end of the press. In this case the packing chamber 103 is unobstructed. The press has the usual ribs or lands 128, and has also the comminuting machine indicated at 129. The clay is extruded through the extruding die 106 and is immediately subjected to the vacuum. The blades on the shaft 110 are illustrated as spaced peripherally around the shaft and extending longitudinally thereof. These cut the material extruded through the die 106 and feed the material toward the opening 114, rapidly breaking the small particles and deforming these to expose different surfaces for the evacuation of air. The material then falls into the hopper 91 and is acted upon by the extrusion press and extruded in the ordinary manner.

In the constructions of Figs. 1 and 2, and 6 and 7, the blades of the extrusion press operate on the comminuted clay and move such particles of clay longitudinally while these are still subjected to the vacuum. This working of the clay exposes different surfaces and thus enables a better evacuation of the air and gases from the particles of the clay. It requires an appreciable length of time to transfer the comminuted particles of clay where they have been broken off by the comminuting blade until they come under the action of the compression screw, which screw packs the clay particles so that the air-tight seal is formed at the end of the extrusion press. By having the sealing chamber, even should it happen that the material is not being extruded from the extrusion press, a seal will yet be maintained. If the extrusion die were directly at the end of the screw of the extrusion press the vacuum might be broken by the clearing of such machine.

The fourth embodiment of the improved apparatus, illustrated in Figs. 10 to 12 inclusive will now be described.

As shown in the drawings, the previously pugged clay may be introduced into the vertical auger 201 through a hopper 202. The auger 201 may include a centrally disposed stem 203 around which the auger knives 204 are rotatably driven, the knives being inclined so as to advance the clay downwardly. The auger knives 204 may be driven in any suitable manner as, for example, by means of a gear 205 and a miter gear 206 mounted upon a driving shaft 207. The lower end of the auger 201 may be provided with any suitable die 210 such as, for example, a die ordinarily employed in making hollow tile.

The clay is advanced by the auger into a feeding chamber composed of an elongated housing 211. The housing 211 is preferably provided with an endless conveyor 212 suitably mounted on driving rollers 213 and 214. The shaft 215 on which the roller 214 is mounted, may be supported in suitable bearings 216 and 217 carried by brackets 218 and 219 respectively within the housing 211.

The shaft 215 preferably extends through a suitable gasket 220 in the wall of the housing 211 and is driven by any suitable means, not shown in the drawings. A plurality of idler rollers 221 support the endless conveyor 212 between the rollers 213 and 214. The conveyor 212 may be made of any suitable material although it has been found that a foraminous conveyor as, for example, one made of wire netting, has been found to be particularly suitable.

The clay extruded through the die 210 by the auger 201 is preferably cut up into very small pieces as by means of a revolving knife 223 mounted upon a shaft 224 extending through the hollow stem 203 and through the die 210. The shaft 224 may be independently operated or driven by the shaft 207 through suitable miter gears 225 and 226. Preferably, the shaft 224 is driven at a higher rate of speed than the auger itself, so as to rapidly break up the extruded clay into very small pieces or particles.

The small pieces of clay may be directed onto the endless conveyor 212 by means of suitable guide plates 208 and 209 extending from the inlet port to the conveyor 212.

The housing 211 is preferably provided with an outlet port in communication with another housing 230. As shown in the drawings, the housing 230 is at right angles to the housing 211 and the housings 230 and 211 are connected together by means of a neck 231. Means for discharging clay periodically from housing 230 are provided. For example, a flying conveyor 232 is positioned within the housing 230 on suitable pulleys 233 and 234. Guide plates 235 and 236 are positioned near the outlet of the housing 211 and between the discharge point of the conveyor 212 and the flying conveyor 232 so as to direct clay from the conveyor 212 onto the conveyor 232. The conveyor 232 may be driven in any suitable manner, the driven roller on which the conveyor is mounted being keyed to a shaft, such as the shaft 237 extending through the housing 230. The driving means are suitably synchronized with the movement of the plunger 242 of the molding machine, as will later appear.

The flying conveyor 232 is adapted to discharge clay periodically into a clay cylinder 240 provided with a head 250, said clay cylinder 240 being in axial alignment with a pressure fluid or steam cylinder 241. The pressure fluid cylinder 241 is provided with a piston operatively connected to a clay piston or plunger 242 by means of piston rods 243. The clay piston 242 may be slidably carried by a hollow stem 244 extending through the clay cylinder 240 into the die 245 attached to the bottom of the clay cylinder. The hollow stem 244 may act as the core in the die 245 when cylindrical objects such as pipe, are being manufactured. The pressure cylinder 241 is provided with suitable pressure fluid lines 246 and 247 and control valves 248 by means of which the clay piston 242 may be caused to reciprocatingly move into and out of the clay cylinder and space between the clay cylinder 240 and pressure cylinder 241. The head 250 may be provided with a window 251 and is operatively connected with the housing 230 by a port 239. The clay feeder or flying conveyor 232 is adapted to discharge clay into the clay cylinder 240 and head 250, through the port 239 in timed relation to the reciprocating movement of the plunger 242, as when the piston 242 is in raised position, as shown in Fig. 11. The levers for actuating valve 248 may be suitably interlocked with the means for actuating the conveyor 232 so as to obtain the timed operation of the conveyor 232 and plunger 242.

It is to be understood that the housings 211 and 230 and the head 250 are made with substantially gas-tight joints; the clay mass being forced downwardly through the die 210 by the auger 201 packs solidly in the die 210 and acts as a seal. Clay in the clay cylinder 240 is pressed downwardly through the die 245 and packs in such die, acting as a seal at that point. Suction is then applied to the apparatus at any desired point, as, for example, to the housing 230 by means of suction line 252 provided with a vacuum gage 253. The entire system, including housing 211, housing 230, head 250 and clay cylinder 240, is thus placed under a vacuum.

Figure 10:
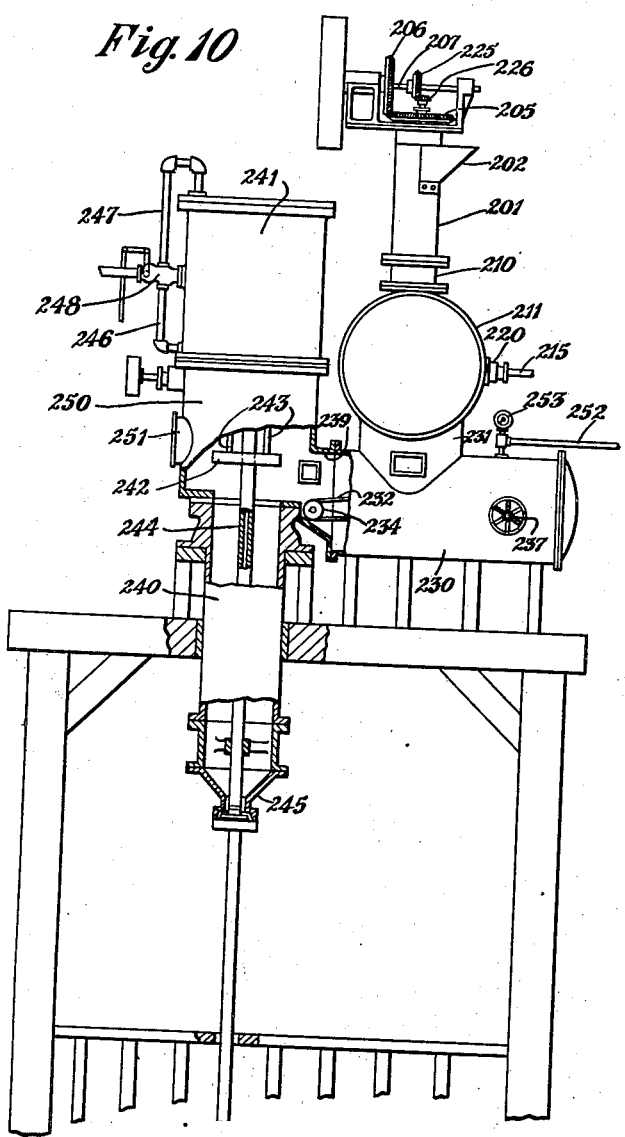
Fig. 10 is a side elevation, partially in section, of a fourth embodiment of the improved apparatus hereof.

In operation of the fourth embodiment of the improved apparatus illustrated in Figs. 10, 11, and 12, and described as aforesaid, the pugged mass of clay composition is placed in the hopper 202 and advanced by the auger 201 through a suitable die 210. The stream or streams of clay extruded through the die 210 are rapidly cut into very small pieces by the independently driven knife blades 223 and the pieces of clay fall upon the endless conveyor 212 which supports and slowly moves the clay toward the outlet. While the pieces of clay are thus distributed over the surface of the conveyor 212, they are exposed to reduce air pressure within the housing 211 and air contained in the clay is thus extracted therefrom. No mechanical pressure is exerted on the moist clay particles.

Preferably, the apparatus is operated under a vacuum of 21 to 26 inches of mercury. The rate at which the clay is fed into the housing 211 by the auger 201 and the speed of the conveyor 212 within the housing 211 are so regulated that the very small clay particles are exposed to the action of vacuum for a length of time sufficient to extract or remove therefrom substantially all of the air carried thereby.

It has been found, for example, that with very plastic clays it is necessary to maintain the clay particles within the housings 211 and 230 for as long as 10 to 15 minutes. The length of time required to remove substantially all of the entrained air will depend, of course, upon the degree of vacuum carried in the apparatus, the fineness of subdivision of the clay and the inherent plasticity of the clay. The continuously advancing conveyor 212 discharges the clay particles upon the flying conveyor 232. The operation of the flying conveyor 232 is synchronized with the operation of the clay piston 242 so that every time the clay piston 242 is raised out of the clay cylinder 240 into the head 250, the flying conveyor 232 quickly advances and deposits a suitable charge of clay in the clay cylinder 240. Instead of employing a continuous conveyor 232, any intermittently operating means for supplying clay to the clay cylinder 240 may be used. The intermittent feeder 232 thus acts as a temporary storage for the clay and materially speeds up the operation. Furthermore, it absorbs any inequalities in the operation of the main conveyor 212.

The clay fed to the clay cylinder is then compressed by the downard motion of the clay piston 242 and the downward pressure exerted on the clay while under vacuum compacts the clay to form a clay mass which is extremely dense. This dense clay mass, substantially free from occluded air, is then discharged through the die 245 in any desired form.

It has been found that molded bodies prepared from clay treated in the apparatus described hereinabove, are extremely strong even in the green state and are entirely free from blisters caused by the escape of air which ordinarily would have been compressed in the clay cylinder 240. Furthermore, the removal of the air from the clay mass appears to increase the plasticity of the clay, the clay particles being in actual contact with each other. Ceramic articles resulting from a molding operation of the character stated, may be produced with lower breakage loss than has ever been heretofore possible.

It is to be noted that in the above apparatus, the clay is exposed to subatmospheric pressure in a finely comminuted or divided condition, thereby exposing a considerable surface to the action of the vacuum existing in the housings 211 and 230. The form of the die 230 through which the clay is admitted into the housing 11 may be varied so as to insure the presence of large surface area on the particles of clay carried by the conveyor 212.

As the molding operation or compacting of the clay in the cylinder 240 takes place in a vacuum, there is no possibility of the plunger 242 trapping and compressing air in the cylinder 240. Substantially all of the power used in moving the plunger 242 is exerted in compacting the clay. In all the forms of apparatus which are illustrated and described herein, the comminuting knives or blades are operated at a higher rate of speed than is practically permissible for the pugging blades, so as to rapidly break up the clay which is extruded into the evacuating chamber into a finely comminuted or divided condition; with the result that the very small pieces or particles of clay are more rapidly and more completely homogenized than is otherwise possible.

The degree of fineness which is necessary to obtain the desired results, varies, of course, with different kinds of clay, and for different kinds of products; and it has been found in practical operations of the improved method and apparatus, that the pugged ceramic material which is extruded into the evacuating chamber should be cut up or comminuted into pieces not exceeding one-half inch in thickness, for the cruder clays or shales from which structural products such as bricks, tiles and sewer pipes are made, and, that the more refined ceramic materials from which pottery, porcelain and semi-porcelain wares are made, should be cut up or comminuted into much thinner pieces, even as thin as $\tfrac{1}{32}$ of an inch, for obtaining the desired results.

I claim:

1. In an apparatus for molding clay, a press having means to form a first clay seal, an extruding die, an evacuated chamber on the side of the die opposite the press, a separate comminuting device mounted in said chamber and disconnected from the press to comminute the material extruded through the die, and means to pack the comminuted material to form a second clay seal.

2. In an apparatus for molding clay, a sealing press having a rotatable shaft with a screw, an extruding die positioned at the end of the screw, an evacuated chamber at the side of the die opposite the screw, a separate comminuting device in the evacuated chamber disconnected from said shaft and operated adjacent the die to comminute the material extruded through the die, and means to engage and pack the comminuted material to form a seal.

3. In an apparatus for molding clay, a sealing press having a rotatable shaft with packing blades and a feed screw thereon, an extrusion die at the end of the shaft, an evacuated chamber at the side of the die opposite the shaft, a separate comminuting shaft having a comminuting blade extending into the evacuated chamber from the side opposite the die and being in substantial alignment with said sealing press shaft, said blade receiving the material extruded through the die, and a press to receive and to compress the comminuted material to form a seal.

4. In an apparatus for molding clay, a sealing press having packing blades and a feeding screw, an extrusion die at the end of the screw, the sealing press forming a first seal on one side of the die, an evacuated chamber on the side of the die opposite the press, a separate comminuting shaft extending into said chamber from the side opposite the die and being in substantial alignment with said sealing press shaft and having a comminuting blade thereon positioned to operate upon the clay extruded through the die, an extrusion press positioned below the evacuated chamber having a connection therewith, said extrusion press having a shaft with blades and a screw thereon, and an extrusion die connected with said extrusion press and forming therewith a second seal.

5. In an apparatus for molding clay, a press for clay, an unobstructed packing chamber for forming a first seal at the end of the press, an extrusion die for receiving clay from the packing chamber, and a separate comminuting device mounted in an evacuated chamber adjacent the discharge end of said die, and means to pack comminuted material to form a second seal.

6. In an apparatus for molding clay, a sealing press having means for engaging and packing clay, an unobstructed packing chamber at the end of the press to receive the clay and form a first seal, an extrusion die on one side of said chamber, an evacuated chamber on the side of the die opposite the press, a separate comminuting shaft extending into said chamber and being disconnected from the press, said shaft having a comminuting blade engaging and comminuting clay extruded through the die, and a second press to operate on the comminuted material and to form a second seal.

7. In an apparatus for molding clay, a sealing press having a first rotatable shaft with a screw thereon to pack the clay, an unobstructed packing chamber at the end of said shaft, an extrusion die in said chamber opposite the end of the shaft, an evacuated chamber on the side of the die opposite the packing chamber and having a separate comminuting shaft extending therein from the side opposite the die, said shaft being in alignment with the shaft of the press and having a comminuting blade thereon to engage and cut extruded material, an extrusion press having a second shaft with a screw thereon positioned below the evacuated chamber to receive the comminuted material, a sealing chamber at the end of the second shaft to receive material compressed by the second shaft, an extrusion die leading from the sealing chamber, such packing chamber forming a first air seal and the sealing chamber forming a second air seal.

8. In an apparatus for molding clay as claimed in claim 7, the sealing and extrusion presses being of substantially the same diameter, having shafts of substantially the same size, and means to drive the shaft of the extrusion press at a higher rate of speed than the shaft of the sealing press.

9. In an apparatus for molding clay as claimed in claim 7, the cross sectional area of the sealing press being smaller than that of the extrusion press and the shaft of the sealing press being of less diameter than that of the extrusion press, and means to drive the shafts of both presses at the same speed.

10. An apparatus for molding clay comprising a sealing press having a longitudinal shaft with a screw blade thereon operating in a tapered part of the press, the shaft terminating at the end of the tapered part, an unobstructed packing chamber at the tapered end of the press and having an extrusion die opposite such tapered end, an evacuated chamber on the side of the die opposite said chamber, a comminuting shaft extending therein from the side opposite the die and having a comminuting blade acting on the material extruded through said die, an extrusion press having a shaft parallel to the shaft of the sealing press and having a tapered section at the discharge end, said second shaft having a screw thereon, a sealing chamber at the end of the tapered portion of the second press and having an extrusion die therein, said packing chamber and sealing chamber forming air seals, a common power drive for the shafts of the sealing and extrusion presses and having a geared connection to drive said shafts.

11. In an apparatus for molding clay, a first and sealing press having an unobstructed packing chamber connected thereto with an extrusion die leading from said chamber, an evacuated chamber on the side opposite the packing chamber, a second and extrusion press connected to the evacuated chamber and having a plug seal forming chamber at one end with a second extrusion means, a comminuting device in the evacuated chamber disconnected from the sealing press, the packing and plug seal forming chambers forming two air seals.

12. In clay molding apparatus, a sealing press having an extruding die, an evacuating chamber, and an extrusion press, rotary means in the sealing press for pugging ceramic material and extruding it through the die into the evacuating chamber, and rotary means in the evacuating chamber for comminuting the ceramic material extruded thereinto, and independent means for operating the comminuting means more rapidly than is practically permissible for operating the pugging or extruding means.

13. In clay molding apparatus, a sealing press having an extruding die, an evacuating chamber, and an extrusion press, rotary means in the sealing press for pugging ceramic material and extruding it through the die into the evacuating chamber, and rotary means in the evacuating chamber for comminuting the ceramic material extruded thereinto, and means for operating the comminuting means more rapidly than is practically permissible for operating the pugging or extruding means.

DAVIS BROWN.